US011979692B2

(12) United States Patent
LeGendre et al.

(10) Patent No.: US 11,979,692 B2
(45) Date of Patent: May 7, 2024

(54) SYSTEMS AND METHODS FOR OPTIMAL COLOR CALIBRATION FOR LED VOLUME STAGES

(71) Applicants: Chloe LeGendre, Los Gatos, CA (US); Paul E. Debevec, Los Gatos, CA (US)

(72) Inventors: Chloe LeGendre, Los Gatos, CA (US); Paul E. Debevec, Los Gatos, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 18/064,655

(22) Filed: Dec. 12, 2022

(65) Prior Publication Data
US 2023/0328212 A1 Oct. 12, 2023

Related U.S. Application Data

(60) Provisional application No. 63/341,369, filed on May 12, 2022, provisional application No. 63/330,236, filed on Apr. 12, 2022.

(51) Int. Cl.
*H04N 9/64* (2023.01)
*G06F 111/18* (2020.01)
*H04N 17/02* (2006.01)

(52) U.S. Cl.
CPC ............. *H04N 9/646* (2013.01); *H04N 17/02* (2013.01); *G06F 2111/18* (2020.01)

(58) Field of Classification Search
CPC ...................................................... H04N 9/646
See application file for complete search history.

(56) References Cited

U.S. PATENT DOCUMENTS

| 6,685,326 | B2 | 2/2004 | Debevec et al. |
| 7,044,613 | B2 | 5/2006 | Debevec |
| 7,436,403 | B2 | 10/2008 | Debevec |
| 7,529,004 | B2 | 5/2009 | Debevec et al. |
| 8,134,555 | B2 | 3/2012 | Debevec et al. |
| 8,988,599 | B2 | 3/2015 | Debevec et al. |
| 9,123,116 | B2 | 9/2015 | Debevec et al. |
| 10,099,644 | B2 | 10/2018 | Debevec et al. |
| 10,375,264 | B2 | 8/2019 | Debevec et al. |
| 2017/0318178 | A1* | 11/2017 | Debevec ................. G06T 15/50 |

FOREIGN PATENT DOCUMENTS

| AU | 2002315016 A1 | 12/2002 |
| EP | 1393124 B1 | 12/2014 |
| EP | 2884337 B1 | 8/2016 |

* cited by examiner

*Primary Examiner* — Gustavo Polo
(74) *Attorney, Agent, or Firm* — Greenberg Traurig, LLP (57) ABSTRACT

The disclosed computer-implemented method includes systems for optimizing color rendition in an LED volume virtual production stage. For example, the described systems optimize or correct color rendition by applying a series of color correction matrices to color pixel values within the virtual production stage and to final captured imagery filmed within the virtual production stage. The described systems generate the color correction matrices from four calibration images taken within the virtual production stage. Various other methods, systems, and computer-readable media are also disclosed.

20 Claims, 3 Drawing Sheets

SYSTEMS AND METHODS FOR OPTIMAL COLOR CALIBRATION FOR LED VOLUME STAGES

PRIORITY APPLICATIONS

This application claims the benefit of U.S. Provisional Application 63/330,236, titled "SYSTEMS AND METHODS FOR OPTIMAL COLOR CALIBRATION FOR LED VOLUME STAGES," filed Apr. 12, 2022; and U.S. Provisional Application 63/341,369, titled "SYSTEMS AND METHODS FOR OPTIMIZING COLOR MATCHING IN AN RGB VIRTUAL PRODUCTION STAGE," filed May 12, 2022. The priority applications are incorporated by reference herein in their entirety.

BACKGROUND

Light emitting diode (LED) volumes are increasingly being used in media production. For example, an LED volume virtual production stage is an enclosed space capable of projecting or displaying a virtual environment where motion picture capture takes place in order to produce TV and/or film. These types of virtual production stages generally include one or more large LED panels (i.e., backdrops) and specialized LED-based lighting, as well as sophisticated and high-powered graphics rendering engines. As such, live actors and props are often filmed in front of a virtual environment displayed by such an LED panel to create a realistic scene.

One advantage of using LED panels is that the practical elements in the scene are lit as if they were present in the scene, virtually eliminating the need for compositing lighting adjustments. The LED panels used in these LED volumes are typically capable of producing light in almost all human-observable colors. As such, this LED-based lighting accurately reproduces a wide range of natural and artificial lighting scenarios. Despite this, when these LED panels are used to light an actor, they often create strange color shifts compared to daylight and traditional studio lighting due to their "peaky" spectral output from narrow-band red, green, and blue LEDs. In particular, this peaky spectral output tends to make skin tones appear overly saturated and too pink in hue.

SUMMARY

As will be described in greater detail below, the present disclosure describes embodiments in which color rendition in images captured within an LED volume virtual production stage is corrected by applying a series of color transform matrices to RGB pixels of the virtual production stage as well as to the final imagery.

In one example, a computer-implemented method for correcting color rendition associated with LED volume virtual production stages includes generating a first pre-correction matrix to be applied to pixel values of light emitting diode (LED) displayed content for out-of-camera-frustum LED pixels within a virtual production stage, generating a post-correction matrix to be applied to final imagery captured by a motion picture camera within the virtual production stage, generating a second pre-correction matrix to be applied to pixel values of LED displayed content for in-camera-frustum pixels within the virtual production stage, and utilizing the first pre-correction matrix, the post-correction matrix, and the second pre-correction matrix to correct color rendition in images taken by the motion picture camera within the virtual production stage. In at least one example, the computer-implemented method also includes adjusting pixel values of in-camera-frustum LED panels by an RGB offset that is based on a black level measurement to account for LED panel reflection.

In some examples, generating the first pre-correction matrix includes solving for a first 3×3 matrix that maps pixel colors of a target scene to LED panel colors within the virtual production stage so that the LED panel colors look similar to the motion picture camera as the pixel colors of the target scene. Additionally, in some examples, generating the post-correction matrix includes solving for a second 3×3 matrix that makes a photograph of a color chart lit by the virtual production stage displaying the target scene closely resemble a photograph of the color chart lit by natural lighting within the target scene. Moreover, in some examples, generating the second pre-correction matrix includes determining a product of the first pre-correction matrix and an inverse of the post-correction matrix.

In at least one example, solving for a 3×3 matrix that maps pixel colors of a target scene to LED panel colors within the virtual production stage includes: generating an in-camera-frustum LED panel color calibration image comprising a patch of pure red, a patch of pure green, and a patch of pure blue displayed by in-camera-frustum LED panels, sampling an average red pixel value, an average green pixel value, and an average blue pixel value from the in-camera-frustum LED panel color calibration image, and solving for the first 3×3 matrix based on the average red pixel value, the average green pixel value, the average blue pixel value, and pixel values of pure red, pure green, and pure blue. In one or more examples, solving for a second 3×3 matrix that makes a photograph of a color chart lit by the virtual production stage displaying the target scene closely resemble a photograph of the color chart lit by natural lighting within the target scene includes generating calibration imagery of the color chart illuminated by each channel of the virtual production stage, and solving for the second 3×3 matrix based on an encoding of the calibration imagery.

In one or more examples, generating calibration imagery of the color chart illuminated by each channel of the virtual production stage includes: generating an out-of-camera-frustum red channel color rendition calibration image by utilizing the motion picture camera to capture an image of the color chart illuminated by a one meter by one meter square of out-of-camera-frustum LED panels set to pure red, generating an out-of-camera-frustum green channel color rendition calibration image by utilizing the motion picture camera to capture an image of the color chart illuminated by a one meter by one meter square of out-of-camera-frustum LED panels set to pure green, and generating an out-of-camera-frustum blue channel color rendition calibration image by utilizing the motion picture camera to capture an image of the color chart illuminated by a one meter by one meter square of out-of-camera-frustum LED panels set to pure blue.

Some examples described herein include a system with at least one physical processor and physical memory including computer-executable instructions that, when executed by the at least one physical processor, cause the at least one physical process to perform acts. In at least one example, the computer-executable instructions, when executed by the at least one physical processor, cause the at least one physical process to perform acts including: generating a first pre-correction matrix to be applied to pixel values of light emitting diode (LED) displayed content for out-of-camera-frustum LED pixels within a virtual production stage, generating a post-correction matrix to be applied to final imagery captured by a motion picture camera within the virtual production stage, generating a second pre-correction matrix to be applied to pixel values of LED displayed content for in-camera-frustum pixels within the virtual production stage, and utilizing the first pre-correction matrix, the post-correction matrix, and the second pre-correction matrix to correct color rendition in images taken by the motion picture camera within the virtual production stage.

In some examples, the above-described method is encoded as computer-readable instructions on a computer-readable medium. In one example, the computer-readable instructions, when executed by at least one processor of a computing device, cause the computing device to: generate a first pre-correction matrix to be applied to pixel values of light emitting diode (LED) displayed content for out-of-camera-frustum LED pixels within a virtual production stage, generate a post-correction matrix to be applied to final imagery captured by a motion picture camera within the virtual production stage, generate a second pre-correction matrix to be applied to pixel values of LED displayed content for in-camera-frustum pixels within the virtual production stage, and utilize the first pre-correction matrix, the post-correction matrix, and the second pre-correction matrix to correct color rendition in images taken by the motion picture camera within the virtual production stage.

In one or more examples, features from any of the embodiments described herein are used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Virtual Production stages are increasingly used in the creation of movies and television shows. In order to create realistic environments, including indoor and outdoor environments, these production stages incorporate many different types of lighting. One such type of lighting includes arrangements of light emitting diodes (LEDs). As noted above, LEDs are often grouped together in what is referred to as an "LED volume." LED volumes, which may include many thousands of individual LED lights or entire LED panels, are increasingly being used in media production to provide different types of lighting. For instance, LED volumes may be used to provide background displays that are capable of showing virtually any image the director may want as a background. LED volumes are also used as a light source to illuminate the actor's faces during filming.

These LED volumes, however, often suffer from color rendition issues when the LED volume is used as both a background display and a light source. In particular, when used as a light source, LED volumes can cause skin tones to become overly saturated. Some example color calibration workflows have attempted to correct these color rendition issues. For example, some example systems have tried to correct color rendition errors by applying a single color correcting matrix to LED pixel values within a virtual production stage. This solution, however, is limited to only the LED pixels that are observable by the camera (e.g., the in-camera background pixels). As such, color rendition errors persist within the virtual production stage when foreground content (e.g., actors, set, props, and costumes) is lit by additional LED-based lighting.

In contrast, the color rendition optimization system described herein calibrates the color rendition of an RGB LED volume virtual production stage in a way that applies, not only to in-camera LED pixels, but also to lighting produced by other LED panels within the virtual production stage. For example, the color rendition optimization system generates three color correction matrices that are based on only four calibration images taken within the virtual production stage. To optimize color rendition within the virtual production stage, the color rendition optimization system applies the three generated matrices to 1) in-camera LED pixels within the virtual production stage, 2) LED panels used for lighting, and 3) final imagery captured by a motion picture camera within the virtual production stage. The result of these applications is improved color rendition—for example by desaturating skin tones toward neutral away from their overly pink/red appearance.

As such, while previous calibration systems concentrate only on the in-camera background imagery, the color rendition optimization system herein ensures optimal color rendition simultaneously for foreground content (e.g., actors, set, costumes) as well as the in-camera background content. Moreover, the color rendition optimization system herein corrects color rendition within virtual production stages without requiring spectral measurements of any part of the virtual stage (e.g., camera, materials, or LED panels), relying instead on the four calibration images mentioned above that are captured with the principal-photography camera for a given LED volume.

In more detail, the color rendition optimization system corrects color rendition within an LED volume virtual production stage by first generating the series of four calibration images. Specifically, the color rendition optimization system generates the calibration images by using the principal-photography camera within the LED volume virtual production stage to capture 1) an image of the LED volume displaying a swatch of pure red, pure green, and pure blue; 2) an image a color chart lit by only red LEDs within the LED volume; 3) an image of the color chart lit by only green LEDs within the LED volume; and 4) an image of the color chart lit by only blue LEDs within the LED volume.

The color rendition optimization system next uses these four calibration images to solve a series of three color correction matrices that include a first pre-correction matrix, a post-correction matrix, and a second pre-correction matrix. For example, the color rendition optimization system solves for the first pre-correction matrix that maps original scene content colors to the LED panel colors within the virtual production stage, so that these colors look the same to the motion picture camera within the virtual production stage as they did as photographed in the original scene. The color rendition optimization system next solves for the post-correction matrix that will make a scene (e.g. actors and their costumes) when illuminated by the LED volume appear as close as possible to how it would appear under the illumination of the original scene— thereby color-correcting in-camera foreground content (e.g., actors' skin tone). Finally, the color rendition optimization system solves for the second pre-correction matrix that will color-correct in-camera background content to make that content appear as close as possible to how it looked in the original scene once the post-correction matrix is applied.

Ultimately, the color rendition optimization system applies these three color correction matrices to different components of the LED volume virtual production stage to optimize color rendition within the LED volume virtual production stage. Specifically, the color rendition optimization system applies the first pre-correction matrix to the pixel values of the LED displayed content for the out-of-camera pixels.

Next, the color rendition optimization system applies the post-correction matrix to the final imagery captured by the camera within the virtual production stage, which color corrects both the in-camera background and recorded foreground content together, without requiring any foreground/background separation. Following this, the color rendition optimization system applies the second pre-correction matrix to pixel values of the LED displayed content for the in-camera-frustum pixels. The result of these applications is recorded content that shows optimized color rendition.

In one or more examples, features from any of the implementations described herein are used in combination with one another in accordance with the general principles described herein. These and other embodiments, features, and advantages will be more fully understood upon reading the following detailed description in conjunction with the accompanying drawings and claims.

Figure 1:
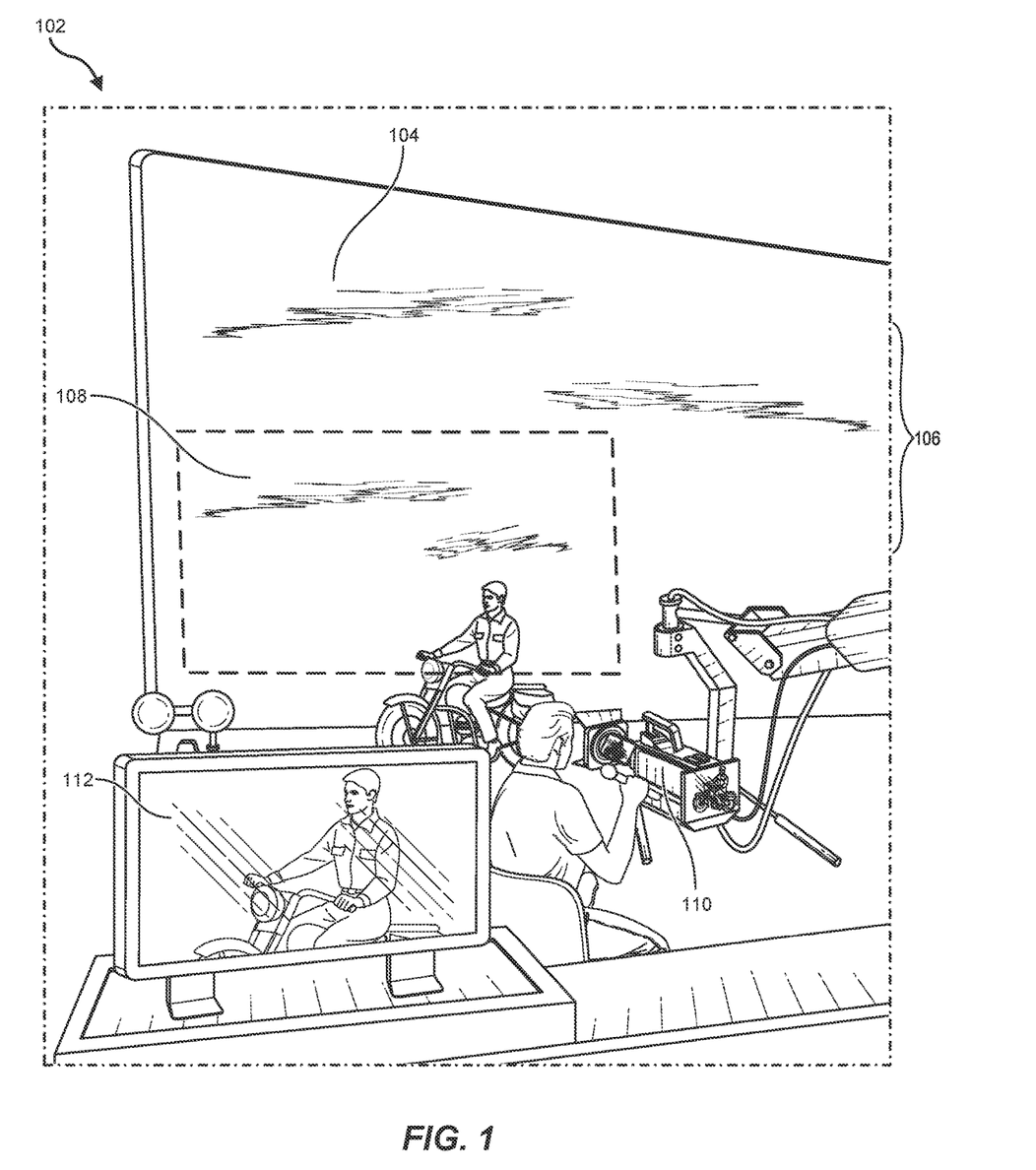
FIG. 1 is an overview diagram of a light emitting diode volume virtual production stage in accordance with one or more implementations.
Figure 2:
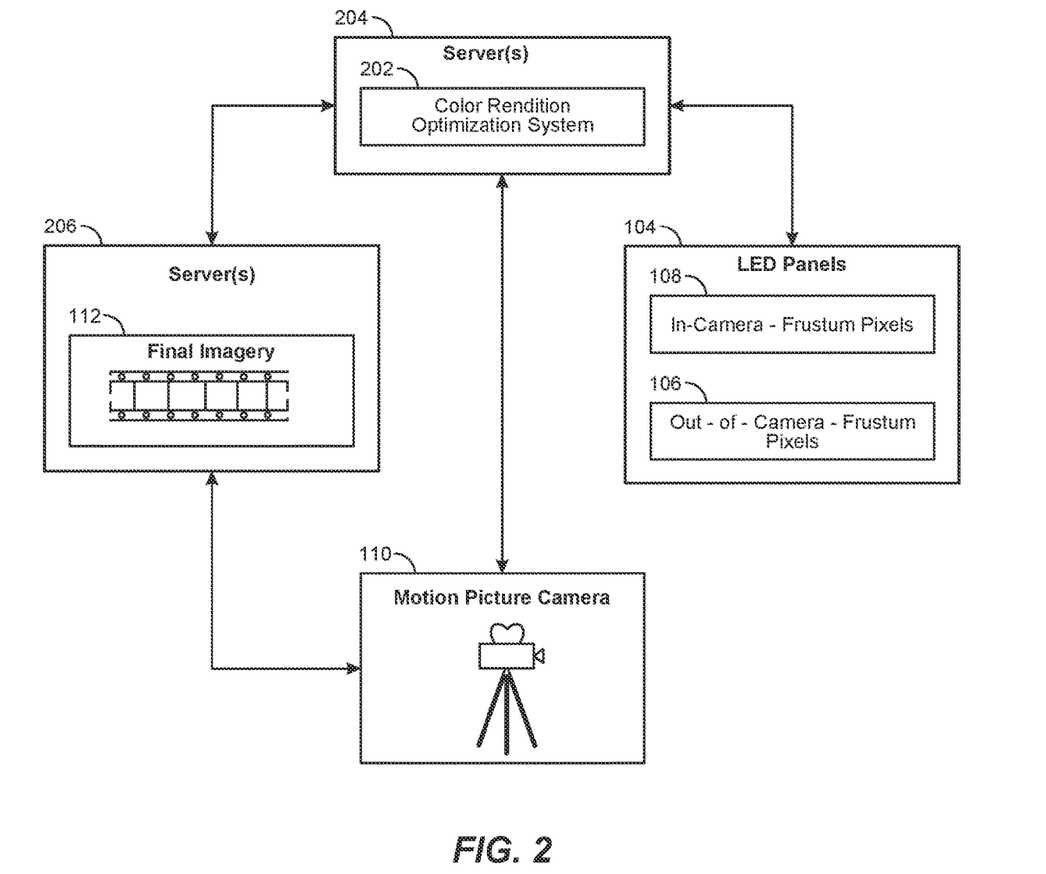
FIG. 2 is a schematic diagram of an environment in which a color rendition optimization system operates in accordance with one or more implementations.
Figure 3:
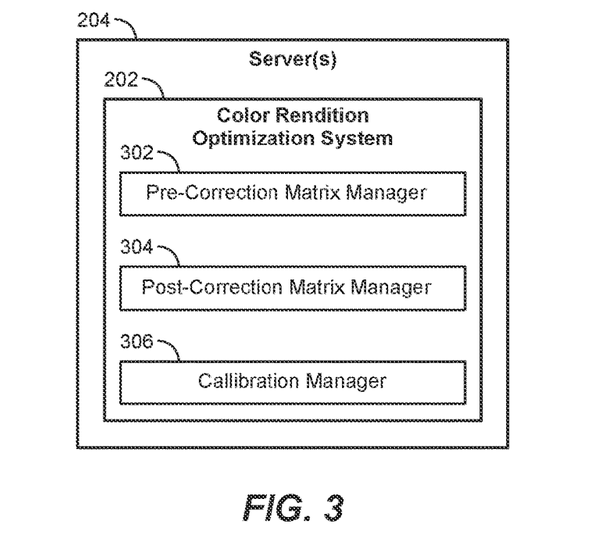
FIG. 3 is a detailed diagram of the color rendition optimization system in accordance with one or more implementations.

The following will provide, with reference to FIGS. 1-4, detailed descriptions of a color rendition optimization system that automatically optimizes color rendition within an LED volume virtual production stage. For example, an example RGB LED volume virtual production stage is illustrated in FIG. 1 to show LED panels including in-camera-frustum pixels and out-of-camera-frustum pixels. The RGB LED volume virtual production stage elements are further shown relative to a color rendition optimization system in FIG. 2. Additionally, additional detail associated with the color rendition optimization system is shown in FIG. 3, while a method flow of the color rendition optimization system generating a series of pre and post correction matrices to optimize or correct color rendition within an LED volume virtual production stage is described in connection with FIG. 4.

As mentioned above, FIG. 1 illustrates an example RGB LED volume virtual production stage 102. In one or more implementations, the virtual production stage 102 includes one or more LED panels 104. For example, each of the one or more LED panels 104 includes a number of RGB LED packages; one package at each pixel. The one or more LED panels 104 work together to display billions of colors arranged into background images.

As further shown in FIG. 1, the one or more LED panels 104 include out-of-camera-frustum pixels 106 and in-camera-frustum pixels 108. As mentioned above, out-of-camera-frustum pixels 106 include pixels of the one or more LED panels 104 that display content but are not currently viewed by a motion picture camera 110. As such, the out-of-camera-frustum pixels 106 illuminate one or more objects in the foreground of the virtual production stage 102 (e.g., the actor, the motorbike). As used herein, the term "out-of-camera-frustum" refers to parts of the LED stage predominantly used for illumination, which are not visible in-camera.

Moreover, the in-camera-frustum pixels 108 include pixels of the one or more LED panels 104 that are viewed by the motion picture camera 110 (e.g., the background pixels behind the actor and motorbike). In one or more implementations, the virtual production stage 102 includes the ability to track movement of the motion picture camera 110 and coordinate pixels of the one or more LED panels 104 with the movement of the motion picture camera 110. Accordingly, the virtual production stage 102 determines which pixels of the one or more LED panels 104 are out-of-camera-frustum pixels 106 and in-camera-frustum pixels 108 on-the-fly during imagery capture as the motion picture camera 110 moves through the virtual production stage 102. As used herein, the term "in-camera-frustum" refers to parts of the LED volume virtual production stage that appear as the in-camera background.

As further shown in FIG. 1, the virtual production stage 102 also includes final imagery 112 captured by the motion picture camera 110. For example, in at least one implementation, the motion picture camera 110 captures the final imagery 112 as digital media that is stored within a digital storage medium. In one or more examples, this digital media is stored at a centralized location or on a local computing machine within the virtual production stage 102. In a preferred implementation, digital media is stored on storage media of the motion picture camera 110 itself.

FIG. 2 illustrates an environmental diagram of a color rendition optimization system 202 operating within the virtual production stage 102. For example, in at least one embodiment as shown in FIG. 2, the color rendition optimization system 202 operates from a server(s) 204 within the virtual production stage 102. In one or more implementations, the color rendition optimization system 202 receives data from and transmits data to the one or more LED panels 104 including the out-of-camera-frustum pixels 106 and the in-camera-frustum pixels 108. Additionally, in at least one embodiment, the color rendition optimization system 202 receives data (e.g., one or more calibration images) from the motion picture camera 110. Moreover, in at least one embodiment, the color rendition optimization system 202 also receives data from and transmits data to a server(s) 206 including the final imagery 112.

In one or more implementations, the color rendition optimization system 202 optimizes color rendition according to one or more assumptions and prerequisites. For example, in at least one implementation, the color rendition optimization system 202 operates according to assumptions and prerequisites including panel and camera linearity, radiometric alignment of different panel types, and high dynamic range image map acquisition and display. In more detail, in at least one embodiment, the color rendition optimization system 202 assumes that an LED volume has been calibrated to act as a linear display. For example, a linear display is one that when displaying a given pixel value ρ it generates lighting spectrum l in some radiometric units, then displaying a pixel value αρ will result in the panel generating a proportional light spectrum αl, as long as αρ does not exceed the maximum brightness of any of the panel's channels and ignoring quantization.

In one or more embodiments, the color rendition optimization system 202 further assumes that the motion picture camera 110 used throughout the imaging workflow also has a linear response. In at least one embodiment, this means that the motion picture camera 110 outputs linear data through RAW (or at least linear) file formats.

Additionally, in one or more embodiments, the color rendition optimization system 202 assumes radiometric alignment of different panel types. For example, in at least one embodiment, the one or more LED panels 104 include multiple types of LED panels, depending on whether they are designed to cover a studio's ceiling, wall, or floor. In at least one implementation, the color rendition optimization system 202 assumes that the relative brightness levels of different panel types comprising an LED volume have been calibrated such that a pixel value of [1, 1, 1] displayed from all directions produces a uniform sphere of light of even intensity and color balance from all directions.

To illustrate, if a ceiling LED panel with a larger pixel pitch has the ability to generate more total illumination than a wall or floor LED panel, the color rendition optimization system 202 assumes that the ceiling panel has been radiometrically adjusted to match the light output of the wall. In another example, if a ceiling panel's white point displaying [1, 1, 1] is more "blue" than the wall or floor LED panels, the color rendition optimization system 202 assumes that the ceiling panel's white balance has been adjusted to match the color output of the wall.

Also as mentioned above, in one or more embodiments, the color rendition optimization system 202 assumes high dynamic range image map acquisition and display. For example, in at least one embodiment, the color rendition optimization system 202 assumes that the lighting environment to be displayed on the virtual production stage will be captured using high dynamic range, panoramic photography techniques. In that embodiment, the color rendition optimization system 202 further assumes that a color chart has been photographed at a spatial location such that the high dynamic range panorama's center of projection matches the location of the color chart in the scene. Additionally, in at least one embodiment, the color rendition optimization system 202 assumes that the virtual production stage is capable of representing the full dynamic range of the high dynamic range image map, without clipping any light sources. As used herein, a color chart refers to a standard color calibration target including a grid of twenty-four squares with each square displaying a different color.

As discussed above, the color rendition optimization system optimizes or corrects color rendition within the virtual production stage 102 by generating three matrices that are based on calibration imagery including four calibration images. In at least one embodiment, these calibration images include an in-camera-frustum LED panel color calibration image, an out-of-camera-frustum red channel color rendition calibration image, an out-of-camera-frustum green channel color rendition calibration image, and an out-of-camera-frustum blue channel color rendition calibration image. Each of these calibration images are now described in detail.

In one or more embodiments, to generate the in-camera-frustum LED panel color calibration image, the color rendition optimization system 202 displays a patch of pure red, a patch of pure green, and a patch of pure blue on in-camera-frustum LED panels (e.g., on in-camera-frustum pixels 108). In at least one embodiment, the color rendition optimization system 202 then causes the motion picture camera 110 to capture a single image that includes all of the patches of pure color, thereby recording the appearance of each LED channel in the virtual production stage 102 to the motion picture camera 110.

In one or more implementations, the color rendition optimization system 202 generates the out-of-camera-frustum red channel color rendition calibration image by turning on a one meter by one meter square of an LED wall of the virtual production stage 102 to pure red (with all of the other one or more LED panels 104 turned off or to black), with a color chart placed one meter from the center of the illuminated square and facing the LED wall with the illuminated square. With the motion picture camera 110 oriented such that its optical axis makes a forty-five degree angle with the surface normal direction of the color chart, the color rendition optimization system 202 captures an image of the color chart illuminated by the pure red square of the LED wall. In one or more embodiments, the color rendition optimization system 202 similarly generates the out-of-camera-frustum green channel color rendition calibration image and the out-of-camera-frustum blue channel color rendition calibration image by changing the one meter by one meter square of the LED wall to pure green and pure blue, respectively.

In additional implementations, the color rendition optimization system 202 can generate these color rendition calibration images in different ways. For example, in one implementation, the color rendition optimization system 202 can generate the out-of-camera-frustum red channel color rendition calibration image by turning on all out-of-frustum LEDs of the virtual production stage 102 to pure red (with all of the other one or more LED panels 104 turned off or to black). Additionally, the color rendition optimization system 202 can generate the out-of-camera-frustum green channel color rendition calibration image by turning on all out-of-frustum LEDs of the virtual production stage 102 to pure green. Finally, the color rendition optimization system 202 can generate the out-of-camera-frustum blue channel color rendition calibration image by turning on all out-of-frustum LEDs of the virtual production stage 102 to pure blue.

As mentioned above, the color rendition optimization system 202 optimizes color rendition within the virtual production stage 102 utilizing three matrices; namely, a first pre-correction matrix, a post-correction matrix, and a second pre-correction matrix. In one or more implementations, the color rendition optimization system 202 generates these matrices based on the calibration imagery discussed above. Each of these matrices is now discussed in detail.

In one or more implementations, the first pre-correction matrix is a primary-based calibration for metameric illuminant matching (referred to herein as M). In one example, to solve for M, the color rendition optimization system 202 extracts average pixel values for regions of interest within the in-camera-frustum LED panel color calibration image corresponding to how the motion picture camera 110 observes pure red, pure green, and pure blue displayed by the one or more LED panels 104. For example, the color rendition optimization system 202 concatenates these sampled values along columns to obtain a 3×3 matrix ([SL]), so-called because its elements are the pairwise dot products of the camera's spectral sensitivity functions and the LED emission spectra. In at least one embodiment, [SL] has the camera's color channels along rows, and the spectral channels of the LED volume along columns.

In at least one implementation, the color rendition optimization system 202 directly solves for the first pre-correction matrix M (e.g., the 3×3 metameric illuminant matching matrix) from [SL], given the following equation (where I is the identity matrix):

$$[SL]MI=I$$

This equation holds because the goal here is that pixel values corresponding to pure red, pure green, and pure blue ([1, 0, 0], [0, 1, 0], [0, 0, 1]) displayed by the one or more LED panels 104 are observed as the same pixel values to the camera. This equation linearly combines the LED primaries as seen by the camera (e.g., the columns of [SL]) to produce the final pixel values of the in-camera-frustum LED panel color calibration image. Based on this, the color rendition optimization system 202 solves for M (e.g., the first pre-correction matrix) using the matrix inversion:

$$M=[SL]^{-1}$$

While other example systems use M to calibrate a virtual production stage for in-camera VFX, the color rendition optimization system 202 utilizes M as a color correction matrix for out-of-frustum content.

In addition to generating the first pre-correction matrix, the color rendition optimization system 202 also generates the post-correction matrix. In one or more implementations, the post-correction matrix is for color rendition calibration (herein referred to as a 3×3 matrix Q). In at least one embodiment, when applied to a final captured image, Q makes a color chart lit by the virtual production stage 102 displaying the high dynamic range environment look as close as possible to how the color chart appeared in the real scene. In one or more implementations, the color rendition optimization system 202 solves for Q utilizing the out-of-camera-frustum red channel color rendition calibration image, the out-of-camera-frustum green channel color rendition calibration image, and the out-of-camera-frustum blue channel color rendition calibration image. A core insight to utilizing these calibration images to solve for Q is that because of the superposition principle for light, any color chart illuminated by the virtual production stage 102 will resemble a linear combination of these three calibration images. Accordingly, by capturing this data, the color rendition optimization system 202 simulates the appearance of a color chart illuminated by any given environment, rather than needing to photograph it each time to compute Q.

At this point, in at least one embodiment, the color rendition optimization system 202 determines that the pixel values sampled from a color chart illuminated by any high-dynamic range (HDR) image-based lighting (IBL) environment (e.g., a high definition image showing a real environment lit by natural lighting) displayed in the virtual production stage 102 and observed by motion picture camera 110 are a linear combination of the sampled pixel values from the out-of-camera-frustum red channel color rendition calibration image, the out-of-camera-frustum green channel color rendition calibration image, and the out-of-camera-frustum blue channel color rendition calibration image. Accordingly, the color rendition optimization system 202 must next determine, for a specific environment, how much of each calibration image to add together to simulate a color chart's appearance. As such, the color rendition optimization system 202 must determine the relationship between the amount of light represented by the one meter by one meter square of light used to illuminate these calibration images as compared with the full sphere of illumination (assuming an ideal virtual production stage with no missing lighting directions). Additionally, in at least one implementation, the color rendition optimization system 202 determines how much of each spectral channel will be used when displaying each unique lighting environment in the virtual production stage 102.

In one or more embodiments, the color rendition optimization system 202 first defines a scale factor β that accounts for the fact that the 1 m×1 m square of illumination, placed 1 m away from the color chart, represents a smaller solid angle compared with the full sphere of illumination. In at least one embodiment, the color rendition optimization system 202 further constructs a cube map environment with a square representing the LED panel. This setup geometry suggests a ~54 pixel width square for a cube map with a face width of 90 pixels, representing ~54°. The color rendition optimization system 202 converts this cube map to a latitude-longitude mapping to compute the diffuse convolution for the frontal direction, which yields β≈0.311 for the 1 m square at a 1 m distance.

Thus, in one or more embodiments, the color rendition optimization system 202 scales the calibration images (the out-of-camera-frustum red channel color rendition calibration image, the out-of-camera-frustum green channel color rendition calibration image, and the out-of-camera-frustum blue channel color rendition calibration image) by 1/β. In one or more implementations, this scale factor depends only on the setup geometry, and not on the individual type of LED panel or camera used. As such, in at least one embodiment, the color rendition optimization system 202 accounts for virtual production stages that are missing some lighting directions and do not contain emissive flooring. As such, in at least one implementation, the color rendition optimization system 202 predicts how a color chart would appear when lit with uniform, omnidirectional illumination for each spectral with only a 1 m×1 m square of LED panels plus the scale factor.

To determine how much of each spectral channel will be used when displaying a particular lighting environment in the virtual production stage 102, the color rendition optimization system 202 leverages the fact that a color chart reflects light mostly diffusely according to Lambert's law, integrating its full frontal hemisphere of lighting directions. Thus, in at least one embodiment, for the purposes of color rendition, the color rendition optimization system 202 focuses on the diffuse integral of the illumination in the virtual production stage 102, rather than the individual contributions of each pixel in the one or more LED panels 104. In one or more embodiments, the color rendition optimization system 202 defines the diffuse integral of the frontal hemisphere of the high-dynamic range image (HDRI) map as the RGB pixel value $w_{avg}$. If the target color chart is photographs while placed at a center of projection of the HDRI panorama, the $w_{avg}$ is equal to the pixel value of the white square of this color chart, scaled up to adjust for the fact that the white square of a typical color chart is only ~90% reflective.

Thus, instead of simply summing together images of the color chart as illuminated by a full sphere of illumination for each spectral channel, the color rendition optimization system 202 scales these images based on the expected overall diffuse integral for a given lighting environment, expressed as $w_{avg}$. This is essentially tinting the full, even sphere of illumination based on the white balance of the given environment, which is measured directly from the appearance of the white square of a color chart placed in the original, real-world scene. However, the color rendition optimization system 202 is employing the first pre-correction matrix M when displaying the out-of-camera-frustum content responsible for color rendition. Thus, in at least one embodiment, rather than tinting the full, even sphere of illumination using $w_{avg}$, the color rendition optimization system 202 tints the full, even sphere of illumination using $Mw_{avg}$.

In one or more embodiments, with the above calibration data, the color rendition optimization system 202 estimates how a color chart illuminated by the virtual production stage 102 displaying a particular HDR IBL will appear. In at least one implementation, the color rendition optimization system 202 uses this estimation to solve for the post-correction matrix Q. In more detail, for a given color chart square j, the color rendition optimization system 202 defines a 3×3 matrix $[SRL]_j$ that encodes the fully-spectral modulation and integration of the camera spectral sensitivity functions, the LED emission spectra, and the material reflectance spectrum. As with the previously defined [SL] matrix, $[SRL]_j$ has the camera's color channels along rows, and the spectral channels of the LED volume along columns. In other words: each column encodes the RGB pixel values of how a particular color chart square j appears when illuminated by each available spectral channel in the virtual production stage 102. In some implementations, there is a different [SRL] matrix for each color chart square, as each color chart square has a unique reflectance spectrum. The pixel values for each [SRL] matrix are captured by the calibration process described above. Finally, the expression to predict how a given color chart square j will appear when illuminated by the virtual production stage 102 displaying an HRD IBL with diffuse integral $w_{avg}$ and out-of-camera-frustum matrix M (e.g., the first pre-correction matrix) is:

$$\frac{1}{\beta}[SRL]_j M w_{avg}$$

In one or more implementations, the color rendition optimization system 202 seeks to match the color rendition properties of the original scene, with target color chart values p. Thus, in at least one embodiment and including the desired post-correction matrix Q, the color rendition optimization system 202 minimizes the squared error between the predicted pixel values and the target pixel values across all n chart squares:

$$\arg\min\left(\sum_{j=1}^{n}\left\|\frac{1}{\beta}Q[SRL]_j M w_{avg} - p_j\right\|\right)$$

In one or more implementations, each chart square of the color chart yields three equations (one each for the red, green, and blue channels of the final image), while Q contains nine unknown variables. The color rendition optimization system 202 therefore chooses three chart squares to match exactly, or uses all twenty four squares of the typical color chart to solve for Q in a least squares sense. For example, in the equation immediately above, [SRL] values are obtained from calibration imagery, while $w_{avg}$ and p are sampled from the target color chart in the original environment. The color rendition optimization system 202 computed M (e.g., the first pre-correction matrix) using the primary-calibration procedure. Accordingly, in at least one embodiment and while M is lighting environment independent, Q depends on the appearance of a color chart in a particular environment and thus changes depending on the target HDRI map.

As mentioned above, in one or more embodiments, the color rendition optimization system 202 further generates a second pre-correction matrix (herein referred to as N). In one or more implementations, by applying the post-correction matrix Q to captured imagery, the in-camera-frustum pixels will also be transformed and will no longer appear correct. While foreground detection or rotoscoping could allow the correction to be applied only to the foreground, the color rendition optimization system 202 removes this added complexity with the second pre-correction matrix N. For example, by knowing the post-correction matrix Q, the color rendition optimization system 202 applies the inverse of this correction to the in-camera-frustum area of the one or more LED panels 104 with Q'. As the background pixels do not contribute significantly to the lighting of the actors, the color rendition optimization system 202 optimizes both the color rendition on the actors and the appearance of the in-camera pixels at the same time, with no foreground/background separation required.

In one or more implementations, given Q and [SL], the color rendition optimization system 202 solves for the in-camera-frustum second pre-correction matrix N according to:

$$Q[SL]NI = I$$

Accordingly, the color rendition optimization system 202 solves for N according to:

$$N = [SL]^{-1} Q^{-1}$$

Furthermore, in at least one implementation, the color rendition optimization system 202 substitutes M for $[SL]^{-1}$, clarifying the relationship between the in-camera-frustum and out-of-camera-frustum matrices:

$$N = MQ^{-1}$$

As such, the color rendition optimization system 202 pre-corrects the in-camera-frustum content with N, expecting to post-correct the content with Q. As Q is lighting environment dependent, N will also vary based on the target HDRI map. In practice, since Q will typically desaturate pixel colors, $Q^{-1}$ will typically increase the saturation of pixel colors.

At this point the color rendition optimization system 202 has solved for the first pre-correction matrix M, the post-correction matrix Q, and the second pre-correction matrix N utilizing the four calibration images discussed above. Accordingly, in at least one embodiment, the color rendition optimization system 202 optimizes color rendition in motion picture imagery captured within the virtual production stage 102 by applying the first pre-correction matrix M to out-of-camera-frustum pixels 106 and applying the second pre-correction matrix N to the in-camera-frustum pixels 108 during filming within the virtual production stage 102. The color rendition optimization system 202 then applies the post-correction matrix Q to the final imagery 112 captured during filming. The result should be that color rendition within the final imagery 112 is optimized, in some examples, by correcting overly pink or red skin tones, orange materials that are shifted toward red, cyan materials that are shifted toward blue, and/or yellow materials that are too dark.

In one or more implementations, the color rendition optimization system 202 accounts for other limitations of LED panels within LED volume virtual production stages. For example, many LED panels used for in-camera-frustum backgrounds are reflective to the point that they reflect back some of the light that hits them (i.e., they have a non-zero albedo). This means that the LED panels oriented to light the actors also have the unwanted side-effect of illuminating the panels used for displaying the in-camera-frustum background. In some implementations, such LED panels have measured albedos at as high as ~4-10%.

To compensate for this, in at least one embodiment, the color rendition optimization system 202 adjusts the pixel values displayed within the in-camera-frustum with an RGB offset, computed based on a "black level" measurement. For example, for each lighting environment, the color rendition optimization system 202 turns on all the content in the out-of-camera-frustum pixels 106, first applying the first pre-correction matrix M. Next, the color rendition optimization system 202 turns off the in-camera-frustum pixels 108 (e.g., the filmed background) and then records a per-lighting-environment average RGB color with the motion picture camera 110 to subtract from the rendered content prior to display.

In more detail, the color rendition optimization system 202 samples a region of interest from such an image, which yields the RGB pixel value $b_{camera}$. This pixel value cannot be used directly for the black level subtraction for the content, as the scale factor between the rendered content and its camera-observed value must be factored in. The color rendition optimization system 202 computes the red pixel value, the green pixel value, and the blue pixel value from the in-camera-frustum LED panel color calibration image to obtain an RGB pixel value $w_{camera}$ of the camera observing a pixel value of [1, 1, 1]. The black level subtracted by the color rendition optimization system 202 from the final rendered content is thus computed as $b_{camera}/w_{camera}$.

While FIG. 2 illustrates one arrangement in which the color rendition optimization system 202 may operate, other arrangements are possible. For example, in one or more implementations, the color rendition optimization system 202 may operate from the motion picture camera 110. In additional implementations, the color rendition optimization system 202 may operate LED panel driver or processor hardware devices associated with the LED panels 104. Moreover, the final imagery 112 may be stored within the motion picture camera 110 or the server(s) 204. As such, the color rendition optimization system 202 may perform computations from other members of the virtual production stage 102—thereby creating a more complete and holistic motion picture camera/LED volume system.

FIG. 3 illustrates a detailed diagram of the color rendition optimization system 202 operating on one or more server(s) 204. As shown, in one or more implementations, the color rendition optimization system 202 includes a pre-correction matrix manager 302, a post-correction matrix manager 304, and a calibration manager 306.

In certain implementations, the color rendition optimization system 202 represents one or more software applications or programs that, when executed by a computing device, causes the computing device to perform one or more tasks. For example, and as will be described in greater detail below, one or more of the components 302-306 of the color rendition optimization system 202 represent software stored and configured to run on one or more computing devices, such as the server(s) 204. In certain implementations, one or more of the components 302-306 of the color rendition optimization system 202 shown in FIG. 3 also represent all or portions of one or more special-purpose computers configured to perform one or more tasks.

As mentioned above, and as shown in FIG. 3, the color rendition optimization system 202 includes the pre-correction matrix manager 302. In one or more implementations, the pre-correction matrix manager 302 generates or solves for the first pre-correction matrix M and the second pre-correction matrix N. For example, in one embodiment, the pre-correction matrix manager 302 solves for the first pre-correction matrix M based on an in-camera-frustum LED panel color calibration image, as described above. Moreover, the pre-correction matrix manager 302 solves for the second pre-correction matrix N based on the first pre-correction matrix M and the post-correction matrix Q, as described above.

In one or more implementations, the pre-correction matrix manager 302 applies the first pre-correction matrix M to out-of-camera-frustum pixels displaying content within a virtual production stage. In at least one embodiment, the pre-correction matrix manager 302 applies the second pre-correction matrix N to in-camera-frustum pixels display content within the virtual production stage.

As mentioned above, and as shown in FIG. 3, the color rendition optimization system 202 includes the post-correction matrix manager 304. In one or more implementations, the post-correction matrix manager 304 solves for the post-correction matrix Q based on an out-of-camera-frustum red channel color rendition calibration image, an out-of-camera-frustum green channel color rendition calibration image, and an out-of-camera-frustum blue channel color rendition calibration image, as described above. In at least one implementation, the post-correction matrix manager 304 applies the post-correction matrix Q to final imagery captured by a motion picture camera within the virtual production stage.

In one or more additional implementations, the pre-correction matrix manager 302 and the post-correction matrix manager 304 may jointly solve for the first pre-correction matrix M and the post-correction matrix Q. For example, in one implementation, the pre-correction matrix manager 302 and the post-correction matrix manager 304 minimize the following objective function, but jointly optimizing for the first pre-correction matrix M and the post-correction matrix Q simultaneously:

$$\arg\min\left(\sum_{j=1}^{n}\left\|\frac{1}{\beta}Q[SRL]_j M w_{avg} - p_j\right\|\right)$$

For example, the pre-correction matrix manager 302 and the post-correction matrix manager 304 may explore this joint optimization approach, while constraining the white point of the content for better on-set appearance and in-gamut content.

As mentioned above, and as further shown in FIG. 3, the color rendition optimization system 202 includes the calibration manager 306. In one or more implementations, the calibration manager 306 generates calibration imagery for use by the pre-correction matrix manager 302 and the post-correction matrix manager 304. For example, as discussed above, the calibration manager 306 generates an in-camera-frustum LED panel color calibration image, an out-of-camera-frustum red channel color rendition calibration image, an out-of-camera-frustum green channel color rendition calibration image, and an out-of-camera-frustum blue channel color rendition calibration image in the manner discussed above.

As described throughout and in many examples, the color rendition optimization system 202 optimizes and corrects color rendition associated with LED volume virtual production stages. In additional examples, the color rendition optimization system 202 optimizes and corrects color rendition associated with other types of virtual production stages. For example, in one implementation, the color rendition optimization system 202 optimizes and corrects color rendition associated with virtual production stages that employ other types of light displays (e.g., liquid crystal displays).

In one or more implementations, the server(s) 204 includes one or more physical processors. Each of the one or more physical processors generally represents any type or form of hardware-implemented processing unit capable of interpreting and/or executing computer-readable instructions. In one embodiment, a physical processor accesses and/or modifies one or more of the components of the color rendition optimization system 202. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, the server(s) 204 includes a memory. Such a memory generally represents any type or form of volatile or non-volatile storage device or medium capable of storing data and/or computer-readable instructions. In one example, a memory stores, loads, and/or maintains one or more of the components of the color rendition optimization system 202. Examples of a memory include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Figure 4:
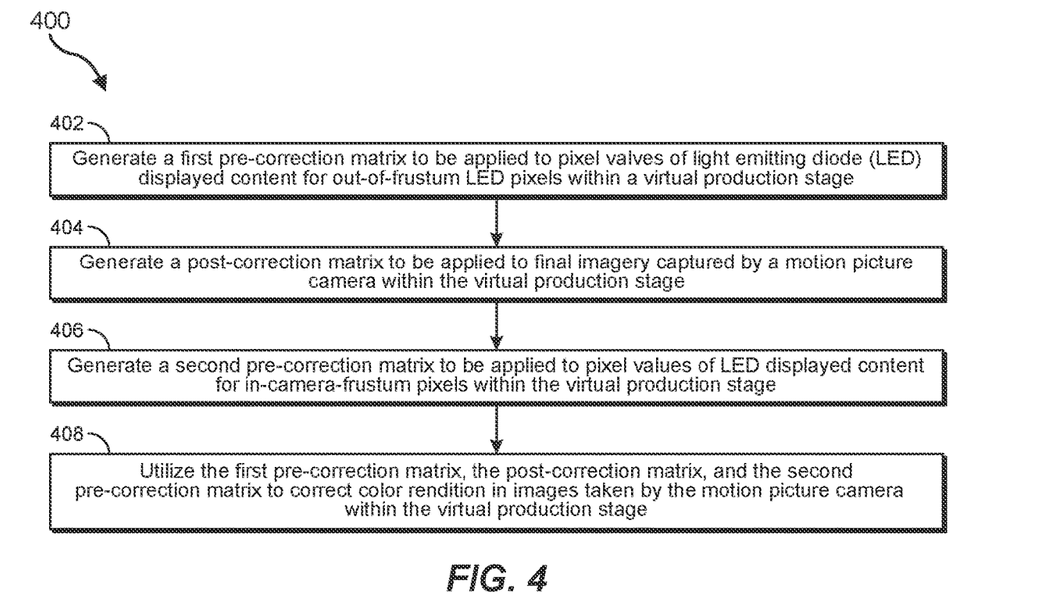
FIG. 4 flow diagram of an exemplary computer-implemented method for optimizing color rendition in connection with the light emitting diode volume virtual production stage in accordance with one or more implementations.

As mentioned above, FIG. 4 is a flow diagram of an exemplary computer-implemented method 400 for optimizing color rendition in motion picture film captured within an LED volume virtual production stage. In various examples, the steps shown in FIG. 4 are performed by any suitable computer-executable code and/or computing system, including the system(s) illustrated in FIG. 3. In one example, each of the steps shown in FIG. 4 represent an algorithm whose structure includes and/or is represented by multiple sub-steps, examples of which will be provided in greater detail below.

In at least one embodiment, as illustrated in FIG. 4, at step 402 the color rendition optimization system 202 generates a first pre-correction matrix (M) to be applied to pixel values of light emitting diode (LED) displayed content for out-of-frustum LED pixels within a virtual production stage. For example, in at least one embodiment, the color rendition optimization system 202 solves for the first pre-correction matrix based on an in-camera-frustum LED panel color calibration image comprising a patch of pure red, a patch of pure green, and a patch of pure blue displayed by in-camera-frustum LED panels.

In one or more embodiments, as further illustrated in FIG. 4, at step 404 the color rendition optimization system 202 generates a post-correction matrix (Q) to be applied to final imagery captured by a motion picture camera within the virtual production stage. For example, the color rendition optimization system 202 solves for the post-correction matrix based on calibration imagery including an out-of-camera-frustum red channel color rendition calibration image, an out-of-camera-frustum green channel color rendition calibration image, and an out-of-camera-frustum blue channel color rendition calibration image.

In at least one embodiment, as further illustrated in FIG. 4, at step 406 the color rendition optimization system 202 generates a second pre-correction matrix (N) to be applied to pixel values of LED displayed content for in-camera-frustum pixels within the virtual production stage. For example, the color rendition optimization system 202 solves for the second pre-correction matrix based on the first pre-correction matrix and the post-correction matrix.

As additionally illustrated in FIG. 4, at step 408 the color rendition optimization system 202 utilizes the first pre-correction matrix, the post-correction matrix, and the second pre-correction matrix to optimize color rendition in images taken by the motion picture camera within the virtual production stage. For example, the color rendition optimization system 202 optimizes color rendition by applying the first pre-correction matrix, the post-correction matrix, and the second pre-correction matrix to pixel values of LED displayed content for out-of-frustum LED pixels within a virtual production stage, final imagery captured by a motion picture camera within the virtual production stage, and pixel values of LED displayed content for in-camera-frustum pixels within the virtual production stage, respectively.

Thus, as shown throughout, the color rendition optimization system 202 improves existing systems by correcting color rendition in images captured within an RGB LED volume virtual production stage. For example, in one or more embodiments, the color rendition optimization system 202 utilizes four calibration images to generate a first pre-correction matrix, a second pre-correction matrix, and a post-correction matrix. In at least one embodiment, by applying these matrices to RGB pixels within the virtual production stage, as well as to final imagery captured within the virtual production stage, the color rendition optimization system 202 corrects color rendition such that, for example, skin tones shift to pink or red, orange materials shift toward red, cyan materials shift toward blue, and yellow materials darken.

EXAMPLE EMBODIMENTS

Example 1: A computer-implemented method for optimizing color rendition within an RGB LED volume virtual production stage. For example, the method may include generating a first pre-correction matrix to be applied to pixel values of light emitting diode (LED) displayed content for out-of-camera-frustum LED pixels within a virtual production stage. The method may further include generating a post-correction matrix to be applied to final imagery captured by a motion picture camera within the virtual production stage, and generating a second pre-correction matrix to be applied to pixel values of LED displayed content for in-camera-frustum pixels within the virtual production stage. Additionally, the method can include utilizing the first pre-correction matrix, the post-correction matrix, and the second pre-correction matrix to correct color rendition in images taken by the motion picture camera within the virtual production stage.

Example 2: The computer-implemented method of Example 1, wherein generating the first pre-correction matrix comprises solving for a first 3×3 matrix that maps pixel colors of a target scene to LED panel colors within the virtual production stage so that the LED panel colors look similar to the motion picture camera as the pixel colors of the target scene.

Example 3: The computer-implemented method of any of Examples 1 and 2, wherein generating the post-correction matrix comprises solving for a second 3×3 matrix that makes a photograph of a color chart lit by the virtual production stage displaying the target scene closely resemble a photograph of the color chart lit by natural lighting within the target scene.

Example 4: The computer-implemented method of any of Examples 1-3, wherein generating the second pre-correction matrix comprises determining a product of the first pre-correction matrix and an inverse of the post-correction matrix.

Example 5: The computer-implemented method of any of Examples 1-4, wherein solving for a 3×3 matrix that maps pixel colors of a target scene to LED panel colors within the virtual production stage includes generating an in-camera-frustum LED panel color calibration image comprising a patch of pure red, a patch of pure green, and a patch of pure blue displayed by in-camera-frustum LED panels, sampling an average red pixel value, an average green pixel value, and an average blue pixel value from the in-camera-frustum LED panel color calibration image, and solving for the first 3×3 matrix based on the average red pixel value, the average green pixel value, the average blue pixel value, and pixel values of pure red, pure green, and pure blue.

Example 6: The computer-implemented method of any of Examples 1-5, wherein solving for a second 3×3 matrix that makes a photograph of a color chart lit by the virtual production stage displaying the target scene closely resemble a photograph of the color chart lit by natural lighting within the target scene includes generating calibration imagery of the color chart illuminated by each channel of the virtual production stage, and solving for the second 3×3 matrix based on an encoding of the calibration imagery.

Example 7: The computer-implemented method of any of Examples 1-6, wherein generating calibration imagery of the color chart illuminated by each channel of the virtual production stage includes generating an out-of-camera-frustum red channel color rendition calibration image by utilizing the motion picture camera to capture an image of the color chart against black in-camera frustum LED panels illuminated by out-of-camera-frustum LED panels set to pure red, generating an out-of-camera-frustum green channel color rendition calibration image by utilizing the motion picture camera to capture an image of the color chart against black in-camera-frustum LED panels illuminated by out-of-camera-frustum LED panels set to pure green, and generating an out-of-camera-frustum blue channel color rendition calibration image by utilizing the motion picture camera to capture an image of the color chart against black in-camera-frustum LED panels illuminated by out-of-camera-frustum LED panels set to pure blue.

Example 8: The computer-implemented method of any of Examples 1-7 further including adjusting pixel values of in-camera-frustum LED panels by an RGB offset that is based on a black level measurement to account for LED panel reflection.

In some examples, a system may include at least one processor and a physical memory including computer-executable instructions that, when executed by the at least one processor, cause the at least one processor to perform various acts. For example, the computer-executable instructions may cause the at least one processor to perform acts including generating a first pre-correction matrix to be applied to pixel values of light emitting diode (LED) displayed content for out-of-camera-frustum LED pixels within a virtual production stage, generating a post-correction matrix to be applied to final imagery captured by a motion picture camera within the virtual production stage, generating a second pre-correction matrix to be applied to pixel values of LED displayed content for in-camera-frustum pixels within the virtual production stage, and utilizing the first pre-correction matrix, the post-correction matrix, and the second pre-correction matrix to optimize color rendition in images taken by the motion picture camera within the virtual production stage.

Additionally in some examples, a non-transitory computer-readable medium can include one or more computer-executable instructions that, when executed by at least one processor of a computing device, cause the computing device to perform various acts. For example, the one or more computer-executable instructions may cause the computing device to generate a first pre-correction matrix to be applied to pixel values of light emitting diode (LED) displayed content for out-of-camera-frustum LED pixels within a virtual production stage, generate a post-correction matrix to be applied to final imagery captured by a motion picture camera within the virtual production stage, generate a second pre-correction matrix to be applied to pixel values of LED displayed content for in-camera-frustum pixels within the virtual production stage, and utilize the first pre-correction matrix, the post-correction matrix, and the second pre-correction matrix to optimize color rendition in images taken by the motion picture camera within the virtual production stage.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of," Finally, for ease of use, the terms "including" and "having" (and their derivatives), as used in the specification and claims, are interchangeable with and have the same meaning as the word "comprising."

What is claimed is:

1. A computer-implemented method comprising:
    generating a first pre-correction matrix to be applied to pixel values of light emitting diode (LED) displayed content for out-of-camera-frustum LED pixels within a virtual production stage;
    generating a post-correction matrix to be applied to final imagery captured by a motion picture camera within the virtual production stage;
    generating a second pre-correction matrix to be applied to pixel values of LED displayed content for in-camera-frustum pixels within the virtual production stage; and
    utilizing the first pre-correction matrix, the post-correction matrix, and the second pre-correction matrix to correct color rendition in images taken by the motion picture camera within the virtual production stage.

2. The computer-implemented method of claim 1, wherein generating the first pre-correction matrix comprises solving for a first 3×3 matrix that maps pixel colors of a target scene to LED panel colors within the virtual production stage so that the LED panel colors look similar to the motion picture camera as the pixel colors of the target scene.

3. The computer-implemented method of claim 2, wherein generating the post-correction matrix comprises solving for a second 3×3 matrix that makes a photograph of a color chart lit by the virtual production stage displaying the target scene closely resemble a photograph of the color chart lit by natural lighting within the target scene.

4. The computer-implemented method of claim 3, wherein generating the second pre-correction matrix comprises determining a product of the first pre-correction matrix and an inverse of the post-correction matrix.

5. The computer-implemented method of claim 2, wherein solving for a 3×3 matrix that maps pixel colors of a target scene to LED panel colors within the virtual production stage comprises:
   generating an in-camera-frustum LED panel color calibration image comprising a patch of pure red, a patch of pure green, and a patch of pure blue displayed by in-camera-frustum LED panels;
   sampling an average red pixel value, an average green pixel value, and an average blue pixel value from the in-camera-frustum LED panel color calibration image; and
   solving for the first 3×3 matrix based on the average red pixel value, the average green pixel value, the average blue pixel value, and pixel values of pure red, pure green, and pure blue.

6. The computer-implemented method of claim 3, wherein solving for a second 3×3 matrix that makes a photograph of a color chart lit by the virtual production stage displaying the target scene closely resemble a photograph of the color chart lit by natural lighting within the target scene comprises:
   generating calibration imagery of the color chart illuminated by each channel of the virtual production stage; and
   solving for the second 3×3 matrix based on an encoding of the calibration imagery.

7. The computer-implemented method of claim 6, wherein generating calibration imagery of the color chart illuminated by each channel of the virtual production stage comprises:
   generating an out-of-camera-frustum red channel color rendition calibration image by utilizing the motion picture camera to capture an image of the color chart illuminated by a one meter by one meter square of out-of-camera-frustum LED panels set to pure red;
   generating an out-of-camera-frustum green channel color rendition calibration image by utilizing the motion picture camera to capture an image of the color chart illuminated by a one meter by one meter square of out-of-camera-frustum LED panels set to pure green; and
   generating an out-of-camera-frustum blue channel color rendition calibration image by utilizing the motion picture camera to capture an image of the color chart illuminated by a one meter by one meter square of out-of-camera-frustum LED panels set to pure blue.

8. The computer-implemented method of claim 1, further comprising adjusting pixel values of in-camera-frustum LED panels by an RGB offset that is based on a black level measurement to account for LED panel reflection.

9. A system comprising:
   at least one physical processor; and
   physical memory comprising computer-executable instructions that, when executed by the at least one physical processor, cause the at least one physical processor to perform acts comprising:
      generating a first pre-correction matrix to be applied to pixel values of light emitting diode (LED) displayed content for out-of-camera-frustum LED pixels within a virtual production stage;
      generating a post-correction matrix to be applied to final imagery captured by a motion picture camera within the virtual production stage;
      generating a second pre-correction matrix to be applied to pixel values of LED displayed content for in-camera-frustum pixels within the virtual production stage; and
      utilizing the first pre-correction matrix, the post-correction matrix, and the second pre-correction matrix to correct color rendition in images taken by the motion picture camera within the virtual production stage.

10. The system of claim 9, wherein generating the first pre-correction matrix comprises solving for a first 3×3 matrix that maps pixel colors of a target scene to LED panel colors within the virtual production stage so that the LED panel colors look similar to the motion picture camera as the pixel colors of the target scene.

11. The system of claim 10, wherein generating the post-correction matrix comprises solving for a second 3×3 matrix that makes a photograph of a color chart lit by the virtual production stage displaying the target scene closely resemble a photograph of the color chart lit by natural lighting within the target scene.

12. The system of claim 11, wherein generating the second pre-correction matrix comprises determining a product of the first pre-correction matrix and an inverse of the post-correction matrix.

13. The system of claim 10, wherein solving for a 3×3 matrix that maps pixel colors of a target scene to LED panel colors within the virtual production stage comprises:
   generating an in-camera-frustum LED panel color calibration image comprising a patch of pure red, a patch of pure green, and a patch of pure blue displayed by in-camera-frustum LED panels;
   sampling an average red pixel value, an average green pixel value, and an average blue pixel value from the in-camera-frustum LED panel color calibration image; and
   solving for the first 3×3 matrix based on the average red pixel value, the average green pixel value, the average blue pixel value, and pixel values of pure red, pure green, and pure blue.

14. The system of claim 11, wherein solving for a second 3×3 matrix that makes a photograph of a color chart lit by the virtual production stage displaying the target scene closely resemble a photograph of the color chart lit by natural lighting within the target scene comprises:
   generating calibration imagery of the color chart illuminated by each channel of the virtual production stage; and
   solving for the second 3×3 matrix based on an encoding of the calibration imagery.

15. The system of claim 14, wherein generating calibration imagery of the color chart illuminated by each channel of the virtual production stage comprises:
   generating an out-of-camera-frustum red channel color rendition calibration image by utilizing the motion picture camera to capture an image of the color chart illuminated by out-of-camera-frustum LED panels set to pure red;

generating an out-of-camera-frustum green channel color rendition calibration image by utilizing the motion picture camera to capture an image of the color chart illuminated by out-of-camera-frustum LED panels set to pure green; and generating an out-of-camera-frustum blue channel color rendition calibration image by utilizing the motion picture camera to capture an image of the color chart illuminated by out-of-camera-frustum LED panels set to pure blue.

16. The system of claim 9, further comprising computer-executable instructions that, when executed by the at least one physical processor, cause the at least one physical processor to adjust pixel values of in-camera-frustum LED panels by an RGB offset that is based on a black level measurement to account for LED panel reflection.

17. A non-transitory computer-readable medium comprising one or more computer-executable instructions that, when executed by at least one processor of a computing device, cause the computing device to:

generate a first pre-correction matrix to be applied to pixel values of light emitting diode (LED) displayed content for out-of-camera-frustum LED pixels within a virtual production stage;

generate a post-correction matrix to be applied to final imagery captured by a motion picture camera within the virtual production stage;

generate a second pre-correction matrix to be applied to pixel values of LED displayed content for in-camera-frustum pixels within the virtual production stage; and utilize the first pre-correction matrix, the post-correction matrix, and the second pre-correction matrix to correct color rendition in images taken by the motion picture camera within the virtual production stage.

18. The non-transitory computer-readable medium of claim 17, further comprising one or more computer-executable instructions that, when executed by the at least one processor of the computing device, cause the computing device to generate the first pre-correction matrix by solving for a first 3×3 matrix that maps pixel colors of a target scene to LED panel colors within the virtual production stage so that the LED panel colors look similar to the motion picture camera as the pixel colors of the target scene.

19. The non-transitory computer-readable medium of claim 18, further comprising one or more computer-executable instructions that, when executed by the at least one processor of the computing device, cause the computing device to generate the post-correction matrix by solving for a second 3×3 matrix that makes a photograph of a color chart lit by the virtual production stage displaying the target scene closely resemble a photograph of the color chart lit by natural lighting within the target scene.

20. The non-transitory computer-readable medium of claim 19, further comprising one or more computer-executable instructions that, when executed by the at least one processor of the computing device, cause the computing device to generate the second pre-correction matrix by determining a product of the first pre-correction matrix and an inverse of the post-correction matrix.

\* \* \* \* \*